United States Patent [19]

Tyler et al.

[11] Patent Number: 5,095,084
[45] Date of Patent: Mar. 10, 1992

[54] PHOTOLABILE POLYMERS WITH METAL-METAL BONDS

[75] Inventors: David R. Tyler, Eugene; Steven C. Tenhaeff, Springfield, both of Oreg.

[73] Assignee: State of Oregon acting by and through The State Board of Higher Education on behalf of The University of Oregon, Eugene, Oreg.

[21] Appl. No.: 412,469

[22] Filed: Sep. 26, 1989

[51] Int. Cl.$^5$ .............................. C08G 18/30
[52] U.S. Cl. ...................... 528/15; 528/19; 528/44; 528/71; 528/272; 528/335
[58] Field of Search ............ 528/44, 71, 15, 19, 528/272, 335

[56] References Cited

PUBLICATIONS

O'Toole, T. R. et al., "Organometallic Photochemistry in Thin Polymeric Films, Photoimaging", *J. Am. Chem. Soc.* III, 5699–5706 (1989).
Meyer, T. J. and Caspar, J. V., "Photochemistry of Metal–Metal Bonds", *Chem. Rev.* 85:187–218 (1985).
Geoffroy and Wrighton, *Organometallic Chemistry*, Academic Press, N.Y. (1979), pp. 61–65, 82–87.
Gonsalves and Rausch, *J. Polym. Sci., Part A: Polym. Chem.* 26:2769–275 (1988).
Patterson et al., *J. Polym. Sci., Polym. Chem. Ed.* 12:837–850 (1974).
Birdwhistell et al., *J. Organomet. Chem.* 157:239–241 (1978).

*Primary Examiner*—Maurice J. Welsh
*Assistant Examiner*—Rachel Johnson
*Attorney, Agent, or Firm*—Klarquist, Sparkman, Campbell, Leigh & Whinston

[57] ABSTRACT

Polymers having photoreactive metal-metal bonds along the backbone of the polymer are disclosed, which bonds rendering the polymers photo-labile. Metals participating in such metal-metal bonds are from Groups VIB and VIIB (first column) of the Periodic Table as well as nickel. Each metal-metal bond is present in a cord group present in at least one monomer incorporated into the polymer. The core group also comprises carbonyl groups and an aromatic cyclopentadienyl (Cp) group bonded to each metal atom. Various organic and organosiloxane linker groups bonded to the Cp groups render the core group-containing monomer polymerizable into a composition of matter having physical properties determined in part by the chemical composition and conformation of the linkers. Reactions for synthesizing core groups, monomers, and various polymers therefrom are disclosed, including copolymerization reactions. Upon exposure to light, the metal-metal bonds in the polymers cleave, effecting more rapid degradation of the polymer than by other processes normally present in the environment.

19 Claims, No Drawings

PHOTOLABILE POLYMERS WITH METAL-METAL BONDS

ACKNOWLEDGEMENTS

This invention was made with government support under the following grants awarded by the National Science Foundation: CHE-8618046.

The government has certain rights in this invention.

FIELD OF THE INVENTION

This invention relates to photoreactive organic polymers.

BACKGROUND OF THE INVENTION

Increasing accumulation of recalcitrant organic plastics and other polymers in the environment has led to inquiries into how to make these materials more degradable. When discarded in the environment, many plastics are virtually indestructible by chemical or biological means normally available in a natural environment. Even though abrasive processes exist in natural environments, many plastics are so durable that hundreds or thousands of years may be required to appreciably reduce the volume of plastics currently in the environment. Hence, there is a need for polymers having sufficient reactivity so as to appreciably shorten their longevity after disposal.

As used herein, a "polymer" is a compound comprised of a continuous, more or less regular, covalently bonded sequence of the same or different structural unit, each type of structural unit, termed a "monomer," having a characteristic molecular structure and elemental composition. While most polymers have a molecular weight of at least 10000 daltons, certain "short" polymers, termed "oligomers," can have a molecular weight as low as about 1000 daltons and comprise only a few (less than 10) monomers. Vollmert, *Polymer Chemistry*, Springer-Verlag, New York (1973).

Reactive polymers are a new area of polymer synthesis and technology, having utility in a variety of technical applications, including catalysts and polymeric supports (see. e.g., Carraber, et al. (Eds.), *Organometallic Polymers*, Academic Press, New York, 1978), ion-exchange resins and perm-selective materials (Benham and Kinstle (Eds.), *Chemical Reactions on Polymers*, ACS Symposium Series 364, American Chemical Society, Washington, D.C., 1988), and selective chelating agents (see. e.g., Sheats, et al., *Metal-Containing Polymeric Systems*, Plenum Press, New York, 1985, pp. 355-366, 385-403, 425-455).

One subset of reactive polymers comprises photochemically reactive polymers. These polymers are of considerable interest because they are potentially useful as degradable plastics, photoresists (see. e.g., Zeldin, et al., (Eds.), *Inorganic and Organometallic Polymers*, ACS Symposium Series 360, American Chemical Society, Washington, D.C., 1988, chapters 2 and 16), and precursors for ceramic materials (id., chapters 2 and 10; Yajima, *Ceramic Bull.* 62:893 (1983)).

Unrelated studies of certain organometallic compounds that comprise carbonyl-containing metal—metal bonded "dimers" (bilaterally symmetrical molecules each comprising a single metal—metal bond crossing the axis of symmetry) have indicated that the metals participating in such bonds appear to be from groups VIB, VIIB, and the first (Fe) column of group VIIIB of the Periodic Table. Meyer and Caspar, "Photochemistry of Metal—Metal Bonds," *Chem. Rev.* 85:187-218 (1985). Nickel also forms such a "dimer." Metal—metal bonded dimers are photoreactive or "photo-labile," such terms denoting the tendency of the metal—metal bonds to photochemically disproportionate or fracture upon exposure to light. Studies of such compounds have heretofore been confined to the dimers in attempts to better understand photochemical reaction mechanisms. There are no known reports of useful polymers having been synthesized either from carbonyl-containing metal—metal bonded "dimers" or any other linkable compound ("monomer") containing a metal—metal bond.

But, there remains a need for photo-labile variants of recalcitrant polymers such as polyurethanes, polyesters, polyamides and other polymers that, at present, collectively pose a staggering disposal problem. Articles made from such photo-labile polymers should self-destruct in an illuminated environment at a rate much faster than the degradation rate of the corresponding polymers that are used presently.

SUMMARY OF THE INVENTION

The present invention encompasses a group of photo-labile monomers and polymers therefrom, at least one monomer of each polymer including a novel core group possessing a covalent bond between a pair of metal atoms along the backbone of the molecule. The metallic elements participating in such metal—metal bonds include those in group VIB of the Periodic Table (Cr, Mo, and W), the first column of group VIIIB consisting of Fe, Ru, and Os, as well as Ni. Each core group also includes a plurality of carbonyl groups, not comprising a portion of the backbone, which are bonded to each metal atom. Continuing along the backbone, each metal atom is also bonded to an aromatic five-carbon ring which, in turn, is bonded to an organic linker portion.

The combination of the pair of covalently bonded metal atoms, the carbonyl groups bonded hereto, the aromatic five-carbon rings, and associated linkers comprise a "monomer" according to the present invention. A plurality of such monomers covalently bonded end-to-end at the linkers comprise a "polymer" according to the present invention. The monomers may also be copolymerized with other groups lacking metal—metal bonds, including oligomers and block copolymers, to lower the number of photo-labile bonds along the polymer backbone. Such copolymerization also permits the photo-labile polymers to be "engineered" for particular physical properties, just as with ordinary polymers lacking metal—metal bonds.

The organic linkers can have any of several sizes, structures, and elemental composition which define various properties of the polymer comprised of the linked monomers. For example, polymerization of monomers synthesized by reacting a diisocyanate with a metal—metal "diol" yields a polyurethane comprising photo-labile metal—metal bonds. Parameters such as the length of at least one of the linkers in each monomer, whether the linkers will have an aliphatic or aromatic character, and the conformation of the linkers, will depend upon which diisocyanate precursor is used. Similarly, reacting metal—metal bonded "diamines" with a diacid or the reaction of a metal—metal bonded "diacid" with an organic diamine will yield polyamides (nylon-like polymers) with metal—metal bonds. Further, polyesters with photo-labile metal—metal bonds can be synthesized by either reacting a metal—metal bonded "diol" with a diester or reacting a metal—metal bonded "diester" with an organic diol.

An even greater variety of polymers can be synthesized by reacting metal—metal bonded monomers or oligomers with monomers or oligomers lacking metal—metal bonds, thereby forming copolymers.

The metal—metal bond in the monomers and polymers of the present invention are photo-labile. That is, the bond fractures upon exposure to light, including visible and ultraviolet light. Hence, the polymers of the present invention have special utility in the manufacture of various plastics capable of degrading in an illuminated environment at a faster rate than the corresponding polymers lacking such metal—metal bonds. As a result, such plastics are suited for use in applications where, for example, rapid decomposition after subsequent disposal in the environment is desired.

Selection of which metallic element to incorporate in the metal—metal bond depends partially upon cost, which is dictated in part by the availability of the element in nature. For example, polymers comprising Fe—Fe bonds would be less expensive than corresponding polymers comprising Mo—Mo bonds or Os—Os bonds. Also, certain metals may be more available as the corresponding carbonyl precursor, such as $Fe(CO)_5$ or $Mo(CO)_6$ for participation in the synthesis reactions as described herein.

A primary object of the present invention is to provide polymers comprising monomers having photo-labile metal—metal bonds.

Another object is to provide such polymers having metal—metal bonds along the backbone so as to enable the polymers to photochemically disintegrate in an illuminated environment.

Yet another object is to provide monomers suitable for use in synthesizing such polymers.

DETAILED DESCRIPTION

The metal—metal bonded compounds of the present invention have a chemistry similar in certain respects to the chemistry of ferrocenes. Gonsalves and Rausch, *J. Polym. Sci.. Part A: Polym. Chem.* 26:2769 (1988). Ferrocenes form various condensation and addition polymers by the reaction of terminal functional groups on the cyclopentadienyl ligands with suitable difunctional molecules. Patterson and McManus, *J. Polym. Sci.: polym. Chem.* 12:837 (1974). The type of polymer resulting from such condensation or addition (e.g., polyurethane, polyamide, polyurea, polyester, or polysiloxane) depends upon the particular functional groups present on both the cyclopentadienyl ligands and the difunctional molecules. For example, reaction of an organic diisocyanate with a ferrocene diol yields a polyurethane in which ferrocene units are incorporated into the polymer backbone. Similarly, reacting an organic diacid with a ferrocene diamine yields a polyamide; and reaction of a ferrocene diol with an organic diester yields a polyester. In each instance, ferrocene units are incorporated into the polymer backbone.

Likewise, it has been found that metal—metal bonded core groups according to the present invention remain intact during various polymerization reactions and become incorporated into the polymer backbone.

A. Synthesis of Photochemically Reactive Polyurethanes and Other Polymers Comprising Mo—Mo Bonds Along the Backbone of the Polymer A polyurethane with Mo—Mo bonds in the backbone was synthesized by reaction of a Mo—Mo bonded "diol" with a diisocyanate. The "diol," ($\eta^5$-$C_5H_4C(O)CH_2OH)_2Mo_2(CO)_6$ (compound 1) was first synthesized as shown in reaction (1). In detail, the synthesis was as follows:

A 150 mL solution of cyclopentadienyl anion sodium salt ($Na^+C_5H_5$) in tetrahydrofuran (THF), where the $Na^+C_5H_5^-$ was generated in situ by reaction of sodium (0.69 g, 30 mmol), with cyclopentadiene ($C_5H_6$; 3.4 mL, 41 mmol), was refluxed for 15 h with ketal-protected methylglycolate (7.81 g, 48.2 mmol). Duggan et al., *Tetrahedron Lett.* 45:4327-4330 (1978). Molybdenum hexacarbonyl [$Mo(CO)_6$] (5.00 g, 18.9 mmol) was then added and the mixture was refluxed for an additional 15 h. Macomber and Rausch, *J. Organomet. Chem.* 258:331-341 (1983 ; Rogers et al., *J. Organomet. Chem.* 238:79-85 (1982). Oxidation of the resulting $(C_5H_4C(O)CH_2OC(CH_3)_2OCH_3)Mo(CO)_3^-$ with ferric nitrate (12.2 g, 30 mmol) in 1.3M aqueous acetic acid yielded the complex 1. Birdwhistell et al., *J. Organomet. Chem.* 157:239-240 (1978).

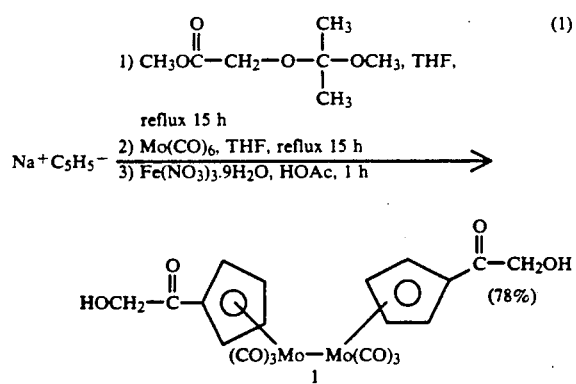

In complex 1, the portion of the molecule including the two cyclopentadienyl groups, the metal—metal (Mo—Mo) bond, and 25 the CO groups associated with the two metal atoms comprise a "core group."

To form a polyurethane, complex 1 (1.95 g, 3.21 mmol) was reacted with 1,6-hexamethylene diisocyanate $OCNC_6H_{12}NCO$ (HMDI; 0.52 mL; 3.2 mmol) in 200 mL refluxing THF using dibutyltin diacetate (DBTDA; 0.08 mL; 0.3 mmol) as a catalyst, as diagrammed in reaction (2):

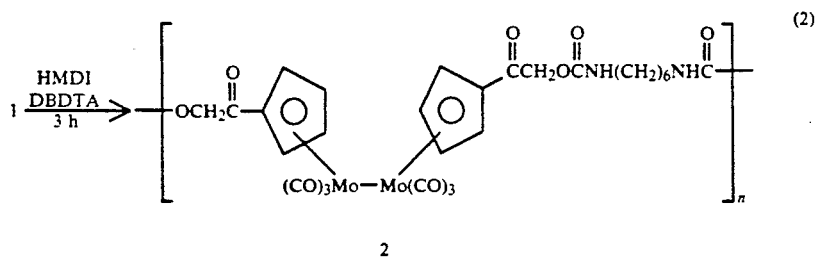

The polymer was precipitated from the reaction mixture by concentrating the solution to 100 mL and then adding the concentrated solution to 250 mL of pentane. Following filtration, washing with ethyl ether and pentane, and drying in vacuo, the polymer (compound 2) was obtained as a bright red-purple powder at 65% yield.

Note that the polymer was formed and precipitated from solution by use of no reactants incompatible with the metal—metal bond, ensuring high yield of the polymer. Incompatible reagents would include halides (halides react with the metal—metal bond to form metal-halide complexes, such as shown in reaction (4), below), and strong oxidizing or reducing agents which also act to cleave the metal—metal bonds.

Referring to compound 2, the (cyclopentadienyl)-$_2$Mo$_2$(CO)$_6$ portion is the "core group." The side chains on the core group are herein referred to generally as "linkers." In compound 2, the right-hand linker includes the polyurethane linkage —O(O)CNH— resulting from the addition reaction of a terminal isocyanate on HMDI with a —COCH$_2$OH group on compound 1. The right-hand linker also includes the hexanyl group —(CH$_2$)$_6$— transferred intact from HMDI. It is clear from this result that other aliphatic and aromatic groups can be transferred intact from the corresponding diisocyanate to the linker.

The IR, NMR, and electronic absorption spectral data for complex 1 and the polymer 2 are summarized in Table I in the second and third rows, respectively. The first row of Table I presents data, for comparison purposes, for (cyclopentadienyl)$_2$Mo$_2$(CO)$_6$, abbreviated as Cp$_2$Mo$_2$(CO)$_6$.

TABLE I

| Compound | $\nu(C\equiv O)$, cm$^{-1}$ | IR (KBr) other bands, cm$^{-1}$ | $^1$H NMR (acetone-d$_6$), δ(ppm) | λ, nm (ε) |
|---|---|---|---|---|
| (CO)$_3$Mo—Mo(CO)$_3$ with two cyclopentadienyl rings | 2012 (sh, vw), 1954 (s), 1925 (m), 1901 (s), 1890 (s) | | 5.60, broad, 5H; 5.44, broad, 5H | 509 (1,730), 388 (18,600) |
| HOCH$_2$-C(=O)-Cp—Mo(CO)$_3$—Mo(CO)$_3$—Cp-C(=O)-CH$_2$OH | 2014 (m), 1955 (s), 1928 (s), 1898 (s) | ν(OH), 3482 (m); ν(C=O), 1682 (s) | a: 4.59, d, 4H, J = 6 Hz; b: 4.17, broad, 2H; c & d: 5.59, broad, 2H; 5.90, broad, 2H; 6.06, broad, 2H; 6.22, broad, 2H | 511 (1,730), 391 (17,700) |
| Compound 1 (polymeric urethane-linked dimer) | 2021 (m), 1967 (s), 1909 (s) | ν(N—H), 3375 (m); ν(N=C=O), 2275 (vw); ν(C=O, urethane), 1724 (s); ν(C=O, keto, 1703 (s); δ(N—H, amide II), 1525 (m); ν(C—N, amide III), 1241 (m) | a: 1.36, broad, 4H; b: 1.52, broad, 4H; c: 3.14, broad, 4H; d: 4.99, s, 4H; e & f: 5.58, broad, 1.5H; 5.90, broad, 2.7H; 6.05, broad, 1.4H; 6.23, broad, 2.3H; g: 6.55, broad, 2H | 503 (1,720), 389 (16,800) |
| Compound 3: CH$_3$(CH$_2$)$_5$NHCOCH$_2$-...-CH$_2$OCNH(CH$_2$)$_5$CH$_3$ | 2021 (m), 1984 (s), 1929 (vs), 1902 (vs) | ν(NH), 3381 (w); ν(C=O, urethane), 1728 (s); ν(C=O, keto), 1706 (s); δ(N—H, amide II), 1516 (m); ν(C—N, amide III), 1243 (m) | a: 0.87, m, 6H; b: 1.29, broad, 12H; c: 1.51, quintet, 4H, J = 7 Hz; d: 3.13, quartet, 4H, J = 7 Hz; e: 4.98, s, 4H; f & g: 5.59, broad, 1.7H; 5.90, broad, 1.8H; 6.04, broad, 1.8H; 6.22, broad, 2.5H; h: 6.50, broad, 2H | 511 (1,870), 389 (16,700) |

The electronic absorption spectrum of each of compounds 1, 2, and the compound $Cp_2Mo_2(CO)_6$ indicate that the Mo—Mo bond is intact in compounds 1 and 2 because the spectra of all three compounds are essentially identical (Table I, last column). The absorption band at approximately 390 nm is assigned to the $\sigma \rightarrow \sigma^*$ (metal—metal bonding to metal—metal antibonding) transition and the absorption band at 504 nm is assigned to the $d\pi \rightarrow \sigma^*$ transition. Geoffroy and Wrighton, *Organometallic Photochemistry*, Academic Press, New York, 1979, p. 61.

The infrared spectra for all three compounds shown in Table I (second and third columns) are also consistent with the structures shown. Note that the C≡O stretching frequencies of the polymer 2 are similar to those of $Cp_2Mo_2(CO)_6$ and compound 1. In addition, the C=O stretch at 1724 cm$^{-1}$ is a signature of the urethane linkage in the polymer 2. Dolphin and Wick, *Tabulation of Infrared Spectral Data*, Wiley-Interscience, New York, 1977: pp. 396–402.

To confirm the assignment of the NMR spectrum of polymer 2 shown in Table I, fourth column, the model complex 3 was synthesized as indicated in Reaction (3):

Academic Press, New York, 1979: p. 83; Meyer and Casper, *Chem. Rev.* 85:187-216 (1985).

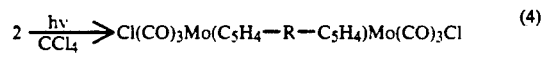

$R = C(O)CH_2OC(O)NH(CH_2)_6NHC(O)OCH_2C(O)$

The product of Reaction (4) has $\nu(C \equiv O)$ bands at 2059 and 1974 cm$^{-1}$ in THF. In comparison, CpMo(CO)$_3$Cl also has bands at 2059 and 1974 cm$^{-1}$ in THF. Fragmentation of the oligomer is confirmed by the disappearance of the $\sigma \rightarrow \sigma^*$ and $d\pi \rightarrow \sigma^*$ absorption bands in the electronic spectrum of the reaction solution.

In another photochemical reaction, the Mo—Mo unit of the oligomer 2 disproportionated when the oligomer was irradiated in the presence of ligands, as shown, for example, in Reaction (5), where P(OEt)$_3$ is triethyl phosphite.

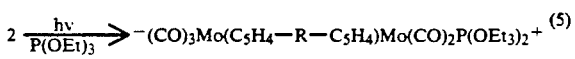

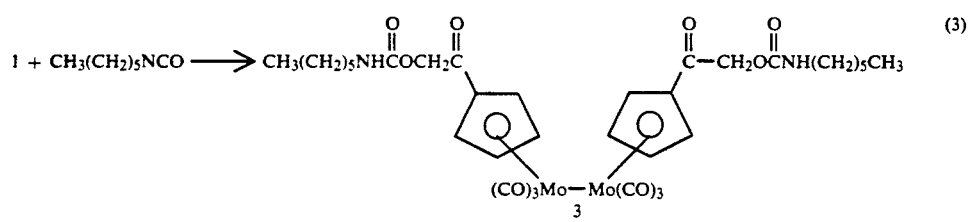

In reaction (3), hexyl isocyanate (0.300 g; 2.36 mmol) was combined with compound 1 (0.499 g; 0.824 mmol) in refluxing THF for 1.5 hours to yield the complex 3 (0.21 g; red crystals; 30% yield). The NMR spectrum of complex 3 is given in Table I, fourth row, fourth column. As can be seen, the NMR spectra of complex 3 and polymer 2 are very similar.

The elemental analysis was also consistent with the proposed polymer formula. Analysis calculated for the monomer of polymer 2, i.e., $C_{28}H_{26}Mo_2N_2O_{12}.0.19C_5H_{12}.0.24(C_2H_5)_2O.0.11C_4H_8O$: C, 44.79; H, 3.91; N, 3.44. Found: C, 44.61; H, 3.99; N, 3.77. (The amounts of pentane, diethyl ether, and THF trapped in the polymer lattice (as given in the elemental analysis) were determined by $^1H$ NMR.)

The number-average molecular weight ($\overline{M}_n$) of the polymer 2 was measured by vapor-pressure osmometry (in acetone) and determined to be $4.0 \times 10^3$. Billmeyer, Jr., *Textbook of Polymer Science*, 2d ed., Wiley-Interscience, New York, 1971, pp. 269-270. The molecule of compound 2 formed under the particular reaction conditions described above is thus best described as an oligomer.

The oligomer 2 forms a bright red film when cast from a THF solution. After exposure to air the film becomes less soluble in acetone and in THF. The decrease in solubility is believed to result from chain extension.

The oligomer 2 undergoes typical photochemical metal—metal bond cleavage reactions in THF solution. For example, the oligomer 2 reacted with light (hv) and carbon tetrachloride (CCl$_4$) according to Reaction (4). Geoffroy and Wrighton, *Organometallic Photochemistry*, The product of Reaction (5) has IR spectral bands at 1999 (w) cm$^{-1}$, 1926 (s) cm$^{-1}$, 1911 (vs) cm$^{-1}$ and 1805 (vs) cm$^{-1}$. For comparison, $(\eta^5-C_5H_4(C(O)CH_2OH)-Mo(CO)_3^-$ has bands at 1910 and 1805 cm$^{-1}$, and $(\eta^5-C_5H_4C(O)CH_2OH)Mo(CO)_2(P(OEt)_3)_2^+$ has bands at 1999 and 1926 cm$^{-1}$. This reactivity is also typical of metal—metal bonded dimers. Stiegman and Tyler, *Coord. Chem. Rev.* 63:217-240 (1985).

B. Other Photochemically Reactive Polymers Embodying Metal—Metal Bonds Along the Polymer Backbone The synthetic methodologies developed for the synthesis of polyferrocenes have been found to be applicable for the synthesis of various polymers with metal—metal bonded core groups. These syntheses require "monomers" comprising metal—metal complexes in which the cyclopentadienyl (Cp) rings have appropriate substituent functional groups:

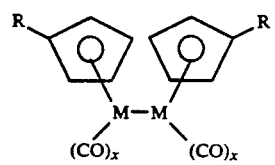

where R =

| where R = | —CH$_2$NH$_2$ | ("diamine") |
|---|---|---|
| | —CH$_2$CH$_2$OH | ("diol") |
| | —C(O)OCH$_3$ | ("diester") |

| | |
|---|---|
| —COOH | ("diacid") |
| —C(O)CH$_2$OH | ("diol") | and where the R groups listed above are for purposes of illustration and are not intended to be limiting.

A first example of a Mo—Mo "diol" monomer was synthesized via the following reaction:

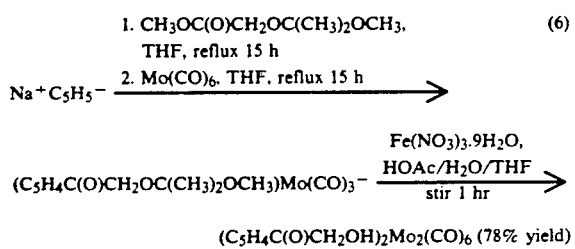

A second example of a Mo—Mo "diol" was synthesized via the following reaction:

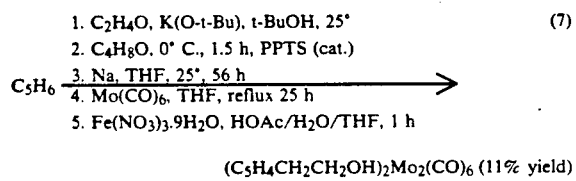

The above and other metal—metal "diols" may be used in polymerization reactions yielding different types of polymers. By way of example, diols react with various organic diisocyanates to form polyurethanes, as disclosed in detail in Part A, above. If the "diol" comprises a metal—metal bond, such metal—metal bond is incorporated intact into the polymer, as disclosed above in Part A. The polymerization reaction to form a polyurethane may be generalized as follows:

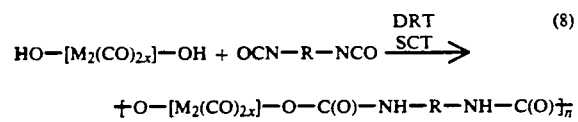

Metal—metal bonded "diols" also react with organic diesters to form polyesters via reactions known in polymer chemistry. Generally, such reactions are acid- or base-catalyzed, so a catalyst such as 4-dimethylaminopyridine or analogous catalyst will probably be required for better yields. The polymerization reaction to form a polyester may be generalized as follows:

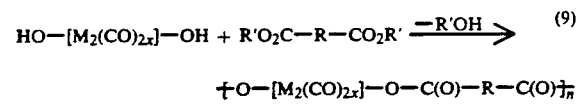

An example of a Mo—Mo "diester" monomer was synthesized via the following reaction:

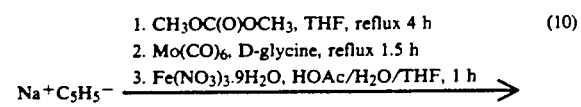

($C_5H_4C(O)OCH_3)_2Mo_2(CO)_6$ (23% yield)

Such a metal—metal bonded "diester" can be reacted with an organic diol to form a polyester via a polymerization reaction known in polymer chemistry. Again, such reactions are generally acid- or base-catalyzed. The polymerization reaction may be generalized as follows:

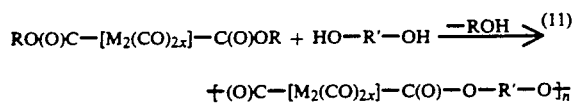

Polysiloxanes can be synthesized by reaction of metal—metal bonded "diesters" with, for example, short-chain carbinol-terminated siloxane block copolymers. One example of such a reaction is as follows:

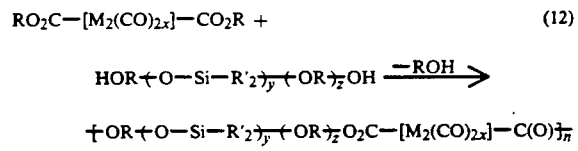

(Short-chain siloxanes as utilized in the above reaction are commercially available.) Note that this technique is also useful for the synthesis of polymers having a lower density of metal—metal bonds along the backbone than the other polymers discussed herein.

An example of a W—W "diacid" monomer was synthesized from a "diester" similar to that formed in Reaction (10) as follows:

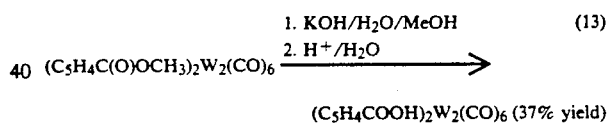

($C_5H_4COOH)_2W_2(CO)_6$ (37% yield)

Such a metal—metal bonded "diacid" can be reacted with an organic diamine to yield a polyamide (nylon-like polymer) via a polymerization reaction known in polymer chemistry. The polymerization reaction may be generalized as follows:

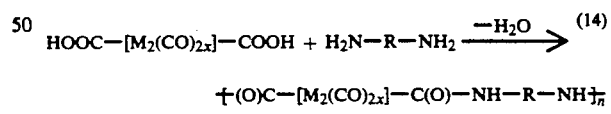

A Mo—Mo "diamine" monomer can be synthesized as follows:

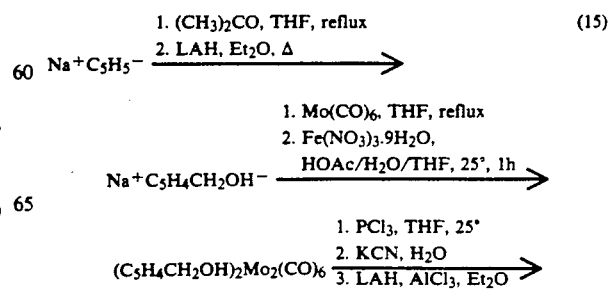

-continued $$(C_5H_4CH_2CH_2NH_2)_2Mo_2(CO)_6$$

Such a metal—metal bonded "diamine" can be reacted with an organic diacid to yield a polyamide, again via a polymerization reaction known in polymer chemistry. Such a polymerization reaction may be generalized as follows:

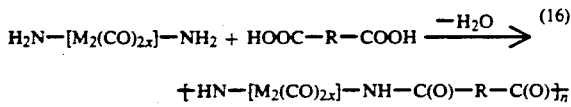

In the above reaction with an organometallic diamine, an acid chloride would be more reactive than an acid, but acid chlorides react with metal—metal bonded dimers to cleave the metal—metal bond and form metal chloride complexes. As a result, acid chlorides cannot be used.

In the discussion above of polysiloxane synthesis, it was mentioned that such a reaction served to reduce the density of metal—metal bonds along the polymer backbone. In a general sense applicable to virtually all polymers herein, the density of metal—metal bonds can be controlled in several ways. One method is to react the difunctional metal—metal bonded species with a "prepolymer," as was done in the synthesis of the siloxane polymer in Reaction 12. Via such a method, the density of the metal—metal bonds in the resulting polymer can be controlled by selecting a prepolymer of an appropriate molecular weight.

A second method for controlling the density of the metal—metal bonds is to make random copolymers. By way of example, if a metal—metal bonded "diol" is being used in the synthesis of a polyurethane, some of the "diol" in the reaction solution can be replaced with an organic diol. In the resulting polymer, the density of the metal—metal bonded core group in the resulting polyurethane will be lower.

The solubility of polymers according to the present invention can be controlled as necessary by breaking up the crystallinity of the polymer, particularly as effected by the organic linkers. This is accomplished by placing bulkier substituent groups along the polymer backbone. The bulkier group can be located on either the organic linker or on the Cp ring of the organometallic core group, whichever is more convenient. For example, referring to equation (2), a polymer analogous to compound 2 was synthesized, but with an additional methyl group on the Cp ring. The resulting polymer was much more soluble in THF than compound 2. The monomers with the bulkier side chains required for these syntheses can be purchased or synthesized by standard methods.

In virtually all the polymerization examples above, the organic portion of either the metal—metal bonded core group, if applicable, or of the difunctional reactant can be selected generally from a variety of aliphatic or aromatic entities. The aliphatics may be branched, unbranched, or ring-shaped. The aromatics may be substituted or unsubstituted. Referring to reaction (2), reaction of the diol 1 with a diisocyanate other than HMDI will form a polyurethane similar to polymer 2 but having a correspondingly greater or lesser number of carbon atoms in the linker and a correspondingly different conformation of the assembled carbon atoms. For example, a polyurethane was also synthesized having six-carbon aromatic rings in the linkers by replacing HMDI with tolylene diisocyanate. In general, aliphatic or aryl difunctional organic reactants having from two to ten carbon atoms may be used in the reactions according to the present invention.

C. Synthesis of Photo-labile Polyurethanes and Other Polymers Comprising Fe—Fe Bonds Along the Backbone of the Polymer Although Reactions (1) through (5) above were demonstrated using Mo—Mo core groups, other metals may replace molybdenum in these compounds that still result in polymers having photo-labile metal—metal bonds. As stated above, the chemistry of other photoreactive metal—metal bonds has been studied by other researchers using compounds comprising only a single metal—metal bond ("dimers"). Meyer and Caspar, "Photochemistry of Metal—Metal Bonds," *Chem. Rev.* 85:187-218 (1985). These studies have shown that nickel as well as metals from Groups VIB (Cr, Mo, W), VIIB (Mn, Tc, Re), and the first column of Group VIIIB (Fe, Ru, Os) of the Periodic Table form photo-labile metal—metal bonds. However, metals from Group VIIB have not been shown to form core groups according to the present invention.

The number of carbonyl groups associated with the metal—metal bond depends upon the group of the Periodic Table from which the particular metal was selected. Metal—metal bonds from Group VIB form a complex with six carbonyls; those from Group VIIB form a complex with ten carbonyls; and those from Group VIIIB (first column) form a complex with four carbonyls as explained by Meyer and Caspar. Ni—Ni bonds form a complex with two carbonyl groups.

Such a variety of metals with which to form photolabile bonds in polymers according to the present invention is advantageous because some of these metals are very rare and, consequently, expensive. In addition, some metals, such as molybdenum, form stronger metal—metal bonds than others, such as chromium. Such differences in metal—metal bond strength, in combination with the variety of polymers that can be synthesized, permit the synthesis of polymers having photoreactive properties "tailored" for a particular use.

By way of example, an iron-containing polymer can be synthesized via a reaction scheme similar to Reactions (1) and (2), above, except that iron pentacarbonyl (Fe(CO)$_5$) is substituted for molybdbnum hexacarbonyl (Mo(CO)$_6$). The first reaction would yield the "diol" 4:

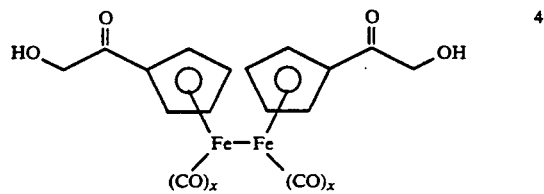

Note that the number of carbonyl groups bonded to each Fe atom is only two instead of three as in compound 1.

To form a polyurethane polymer, the "diol" 4 is reacted with, for example, 1,6 hexamethylene diisocyanate in THF using DBTDA or other suitable catalyst in a reaction similar to Reaction (2), yielding the polymer 5:

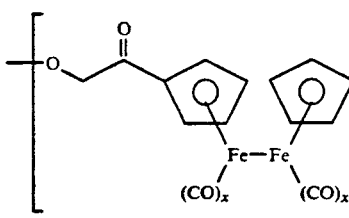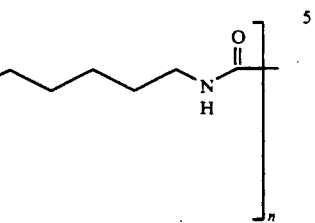

The (Cp)$_2$M$_2$(CO)$_{2x}$ core group in monomers and polymers of the present invention are remarkably stable in reactions involving the addition of linkers and in polymerization reactions. Such stability is a distinct benefit because the present invention makes available for the first time a new family of various degradable polymers embodying such photo-labile metal—metal bonds.

One important use for such polymers is in the manufacture of disposal plastic containers that decompose rapidly when discarded in illuminated environments. Disproportionation of photo-labile bonds along the polymer backbone causes the polymer molecule to break up into smaller molecules, causing not only physical deterioration of the article but also facilitating biological activity leading to biodegradation of the article.

Having illustrated and described the principles of our invention, it should be apparent to those of ordinary skill in the art that the specific examples described herein may be modified in detail without departing from such principles. We claim as our invention all such modifications as come within the true spirit and scope of the following claims.

We claim:

1. A polymer having a polymer backbone, the polymer comprising in the polymer backbone at least one monomer of the formula:

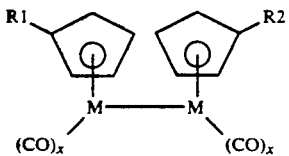

wherein
M is a metal selected from the group consisting of Cr, Mo, W, Fe, Ru, Os, and Ni;
X is an integer representing the number of CO groups bondable to each M in the monomer; and
R1 and R2 are linkers coupling said monomer to the polymer backbone.

2. A copolymer having a polymer backbone, the copolymer comprising in the polymer backbone at least one monomer of the formula:

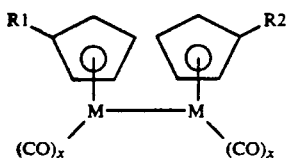

wherein
M is a metal selected from the group consisting of Cr, Mo, W, Fe, Ru, Os, and Ni;
x is an integer representing the number of CO groups bondable to each M; and
R1 and R2 are linkers coupling said monomer into the polymer backbone.

3. A photo-labile polymer comprised of a plurality of covalently bonded monomers, the polymer of the formula:

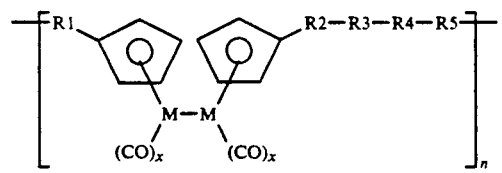

wherein
n is an integer greater than 1;
the sequence -R1-cyclopentadienyl-M-M-cyclopentadienyl-R2- in each said monomer comprises in combination a backbone of the polymer;
M is a metal selected from the group consisting of Cr, Mo, W, Fe, Ru, Os, and Ni;
x is an integer representing the number of CO groups bondable to M;
R1 and R2 are independently selected from the group consisting of
(a) a single covalent bond;
(b) C$_1$-C$_{10}$ alkyls, alkenyls, amino-alkyls, amino-alkenyls, carbonyl-alkyls, carbonyl-alkenyls, carboxyl-alkyls, carboxyl-alkenyls, oxy-alkyls, oxy-alkenyls, amido-alkyls, and amido-alkenyls; and
(c) substituted and unsubstituted C$_1$-C$_{10}$ aryls, alkaryls, alkenylaryls, carbonyl-aryls, carbonyl-alkaryls, carbonyl-alkenylaryls, carboxyl-aryls, carboxyl-alkaryls, carboxyl-alkenylaryls, oxy-aryls, oxy-alkaryls, oxy-alkenylaryls, amino-aryls, amino-alkaryls, amino-alkenylaryls, amido-aryls, amido-alkaryls, and amido-alkenylaryls;
R5 is independently selected from the group consisting of a single covalent bond, and amino, carbonyl, carboxyl, oxy, amido, and amino-carbonyl moieties;
R3 is selected from the group consisting of a single covalent bond, and amino, carbonyl, oxy, oxy-amido, amido, amino-carbonyl, carboxyl, and oxy-carbonyl moieties; and
R4 is selected from the group consisting of C$_1$-C$_{10}$ alkyls, alkenyls, aryls (substituted and unsubstituted), alkaryls (substituted and unsubstituted), alkenaryls (substituted and unsubstituted), and siloxanes.

4. A photo-labile polyurethane according to claim 3 wherein R3 is an amido moiety and R5 is an amino-carbonyl moiety.

5. A photo-labile polyurethane as recited in claim 4 wherein R1 and R2 are each a carbonyl-methyl group.

6. A photo-labile polyurethane as recited in claim 5 wherein R4 is a hexanyl group.

7. A photo-labile polyurethane according to claim 6 wherein:
x is 3; and
M is selected from the group consisting of Cr, Mo, and W.

8. A photo-labile polyurethane according to claim 6 wherein:

x is 2; and
M is selected from the group consisting of Fe, Ru, and Os.

9. A photo-labile polyurethane according to claim 6 wherein:
x is 1; and
M is Ni.

10. A photo-labile polyamide according to claim 3 wherein R1 is a carboxyl moiety, R3 is an amido moiety, and R5 is an amino-carbonyl moiety.

11. A photo-labile polyamide according to claim 10 wherein;
x is 3; and
M is selected from the group consisting of Cr, Mo, and W.

12. A photo-labile polyamide according to claim 10 wherein:
x is 2; and
M is selected from the group consisting of Fe, Ru, and Os.

13. A photo-labile polyester according to claim 3 wherein R1 and R2 are alkoxy moieties, and R3 and R5 are carbonyl moieties.

14. A photo-labile polyurethane of the formula:

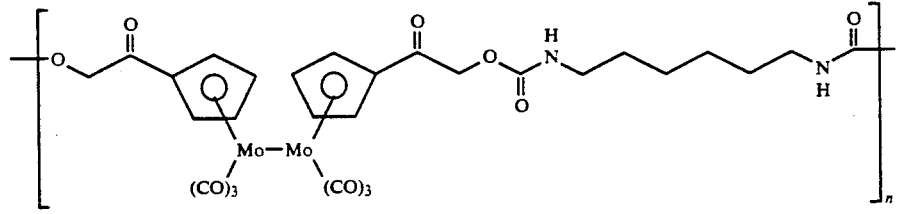

wherein n is an integer greater than 1.

15. A photo-labile polyurethane of the formula:

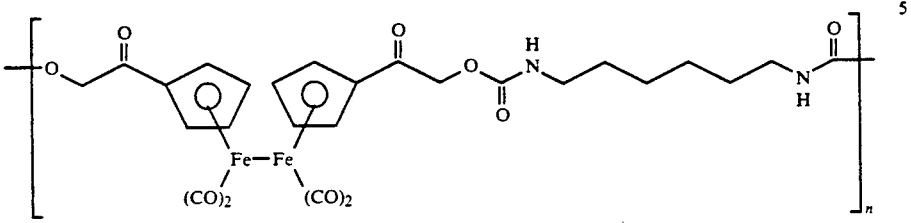

wherein n is an integer greater than 1.

16. A photo-labile polyurethane of the formula:

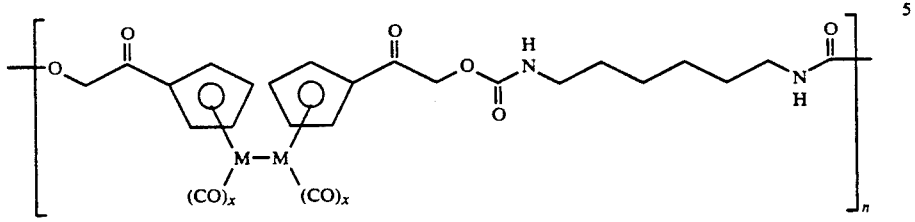

wherein
x is 3 and M is Mo; or
x is 2 and M is Fe; and
n is an integer greater than 1.

17. A photo-labile polyamide of the formula:

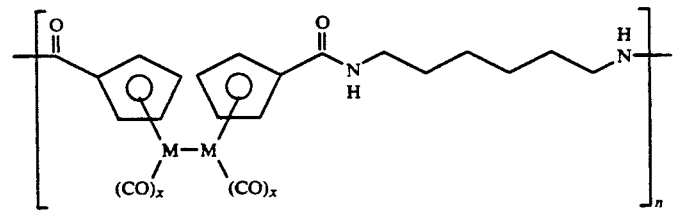

wherein
x is 3 and M is selected from the group consisting of Cr, Mo, and W; or
x is 2 and M is selected from the group consisting of Fe, Ru, and Os; and n is an integer greater than 1.

18. A photo-labile polyester of the formula:

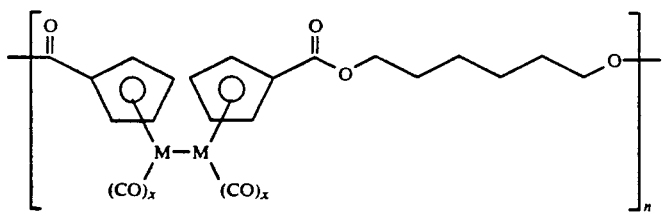

wherein
- x is 3 and M is selected from the group consisting of Cr, Mo, and W; or
- x is 2 and M is selected from the group consisting of Fe, Ru, and Os; and
- n is an integer greater than 1.

19. A polymer having at least one metal—metal bond along the backbone of the polymer, wherein:
- the metal—metal bond is photo-labile;
- the metal—metal bond comprises a first metal atom bonded to a second metal atom, wherein each first and second metal atom is bonded to a separate substituted cyclopentadienyl ring; and
- the polymer is selected from the group consisting of organic and organosilyl polymers.